A. W. ALTORFER.
DRIVING MECHANISM.
APPLICATION FILED JAN. 22, 1915.
1,302,120.
Patented Apr. 29, 1919.
2 SHEETS—SHEET 2.
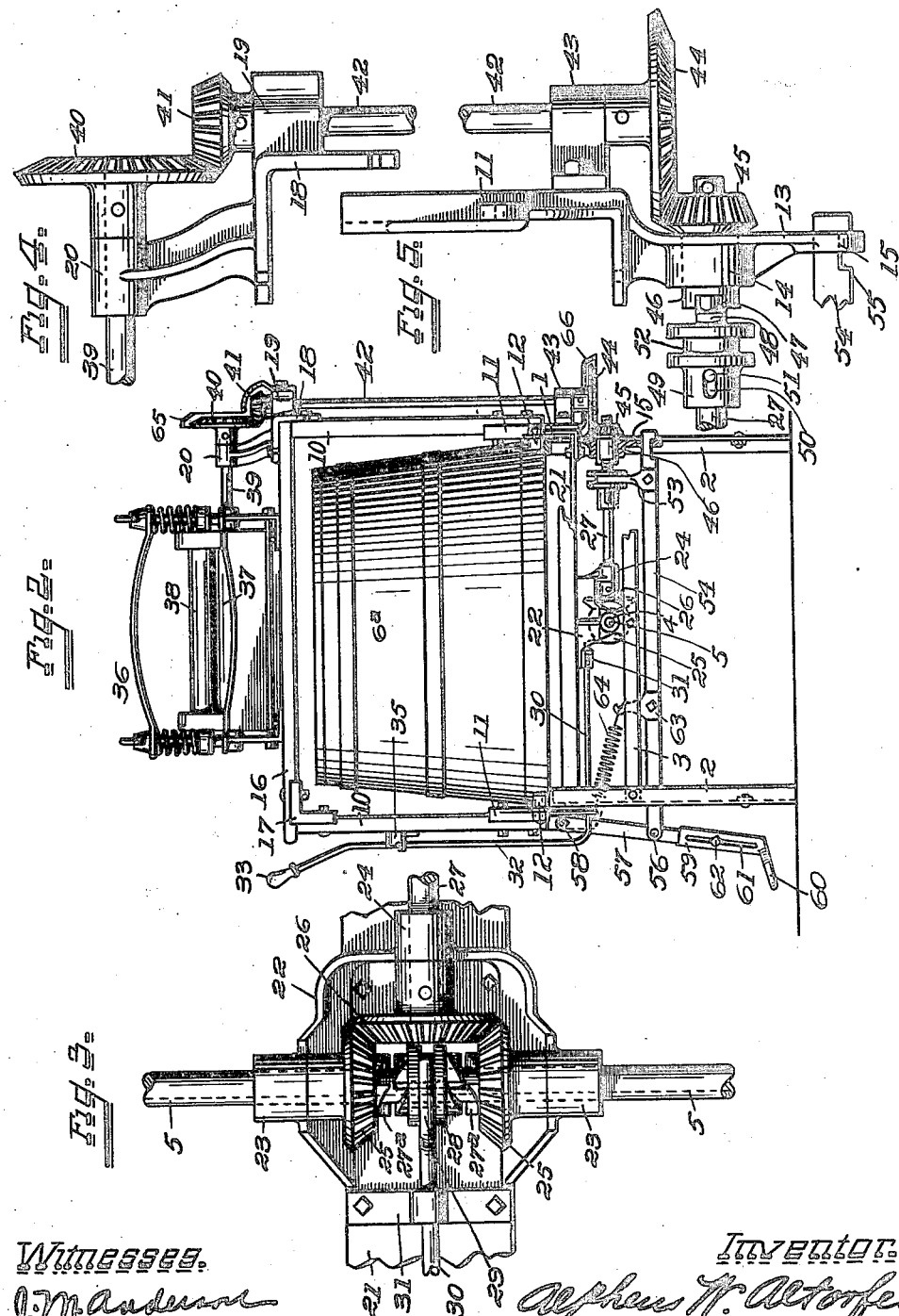
Witnesses.
J. M. Anderson
P. M. Copeland
Inventor.
Alpheus W. Altorfer
LaPorte & Kean
Attys.

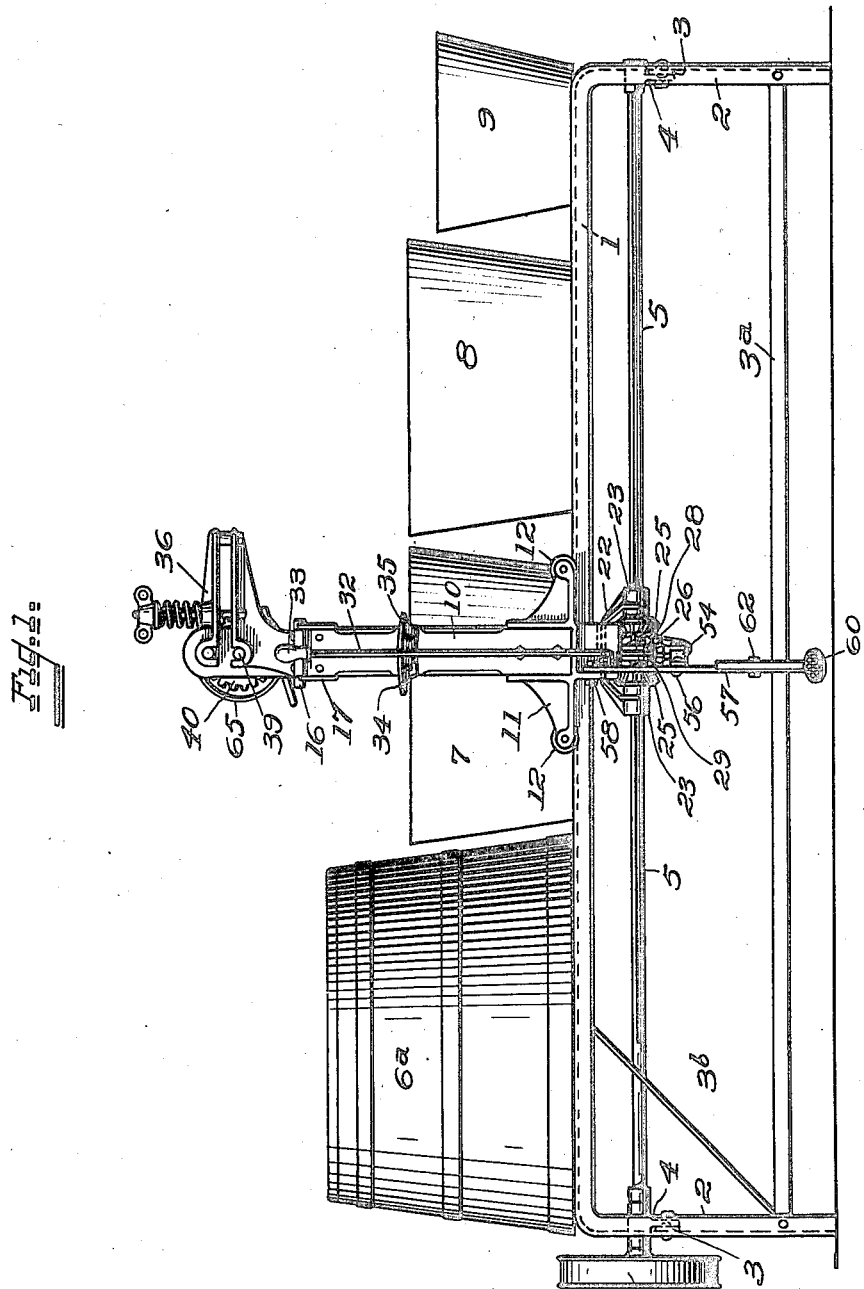

UNITED STATES PATENT OFFICE.

ALPHEUS W. ALTORFER, OF PEORIA, ILLINOIS.

DRIVING MECHANISM.

1,302,120.  Specification of Letters Patent.  Patented Apr. 29, 1919.

Application filed January 22, 1915. Serial No. 3,778.

*To all whom it may concern:*

Be it known that I, ALPHEUS W. ALTORFER, a citizen of the United States, a resident of Peoria, in the county of Peoria and State of Illinois, have invented new and useful Improvements in Driving Mechanism, of which the following is a specification.

This invention has reference to certain new and useful improvements in washing machines and has particular reference to that type of washing machine having a wringer movably supported with relation to the machine.

One of the objects of the invention is to mount the wringer transversely of the support and to provide a mounting therefor which may be moved longitudinally of the support so as to move the wringer from a position between the washing machine and the rinse water tub, to a position on the other side of said rinse water tub and between the same and a second rinse water tube, bluing water tub, basket or other receptacle, and to again move the said wringer to a position on the other side of said second rinse water tub, bluing water tube, basket or other receptacle and between the same and an additional tub or receptacle.

The invention has for a further object to provide a driving means for a wringer including clutch controlled gearing for transmitting motion from a main drive shaft to the wringer, the clutch being controlled by a suitable lever, shifting it into or out of operation with the gearing, and also in the provision of clutch controlled means between said clutch controlled gearing and said wringer, said clutch controlled means being actuated preferably by a foot lever, whereby motion may not be transmitted from the clutch controlled gearing to the wringer, except when the operator or attendant has his or her foot on said foot lever, for placing said clutch controlled means in operative connection with the power transmitting means between the clutch controlled gearing and said wringer.

The invention has for a further object, a wringer slidably supported with respect to the washing machine, a main driving shaft, a transversely disposed shaft, and an upright shaft for transmitting movement from said transverse shaft to the wringer; of clutch controlled gearing between said driving shaft and said transverse shaft and clutch controlled means between said transverse shaft and said upright shaft, said clutch controlled means being moved into operative relation through the agency of a foot pedal adapted to be held in operative position by the pressure of a foot of the operator or attendant.

That the invention may be more fully understood, reference is had to the accompanying drawings forming part of this specification, in which:

Figure 1 is a side elevation of a washing machine showing my improvements applied thereto;

Fig. 2 is an end elevation of my machine, looking in at the right hand side of Fig. 1, with parts broken away and other parts shown in section;

Fig. 3 is a bottom plan view in detail, showing the clutch controlled gearing for transmitting motion from the driving shaft through a transversely disposed shaft, to the wringer;

Fig. 4 is an enlarged detailed elevation, showing the gearing for transmitting motion from the upright shaft to a shaft of one of the wringer rolls, also a bracket forming a bearing for said shafts;

Fig. 5 is a detail in elevation showing the gearing between the transversely disposed shaft and the upright shaft, also the clutch controlled means adapted to be regulated by a foot pedal and a bracket froming a bearing for said transverse shaft and said upright shaft.

The present invention has reference to washing machines having a wringer adapted to be moved relatively thereto whereby the wringer may be caused to register with the washing machine or one or more tubs or other receptacles and power driven in any of its adjusted positions, said driving means including reversing means for reversing the wringer at will. As previously stated, the wringer is preferably of the sliding type, that is to say, mounted so as to be moved longitudinally of an elongated support, said support forming a rest for the washing machine and one or more tubs and receptacles, the wringer being arranged transversely of said supports and being connected to a bar secured to uprights located upon opposite sides of the support. The arrangement of the driving means for the wringer is such that the driving connections between the power and the wringer are not disturbed during the movement of the wringer from one position to another on the support.

The operation of the machine after clothes have been subjected to a washing operation in the washing machine, is as follows: The wringer is moved to a position adjacent the washing machine and between the same and the first rinse water tub. When in this position, the lid of the washing machine may be raised, the clutch thrown into operation with the gears for transmitting movement from the power shaft to the wringer and the foot treadle pressed down so as to connect the mechanism between the clutch controlled gearing and the wringer, for placing the wringer in operation, when the clothes may be taken from the washing machine, passed directly therefrom through the wringer and deposited in the rinse water tub.

The washing machine is again filled with clothes and the mechanism thereof set in motion for a second operation, while at the same time the wringer is moved to a position on the other side of the rinse water tub and between it and a second rinse water tub, bluing water tub, basket or other receptacle, and operated in manner previously stated, so that clothes taken from the first mentioned rinse water tub may be passed directly therefrom through the wringer and into a second rinse water tub, bluing water tub, basket or other receptacle. With this type of machine, the movement of the wringer is limited only by the length of the elongated support for the machine and tubs or receptacles, so that as many receptacles may be used as deemed convenient or advisable.

In the drawings, the elongated support for the washing machine and tubs or receptacles, comprises the side rails 1 bent to form the legs 2. The legs are braced by the transverse connecting bars 3 to which are secured bearings 4, in which are journaled the opposite ends of the main driving or master shaft 5. Said shaft 5 carries a pulley or suitable wheel 6 adapted to receive power from an electric motor, gasolene engine or some other suitable source of power. Longitudinal braces 3$^a$ are provided connecting the legs 2 on the same side of the machine, and if desired, diagonal braces 3$^b$ may be employed.

The rails 1 are preferably made of angle iron with the flat side of the angle iron up, forming a track for rollers carried by the supporting means on which the wringer is moved from one position to another on said support.

The support may form a rest for the washing machine 6$^a$ and the tubs or other receptacles 7, 8 and 9. In the drawings, the washing machine is shown without any of its operative parts and the driving mechanism which would be employed for actuating the machine parts from the driving shaft has been omitted, as such do not form any part of the invention claimed.

The wringer support comprises the uprights or standards 10 located upon opposite sides of the elongated support, their lower ends being suitably secured to shoes or runners 11. These shoes or runners have journaled thereon, preferably flanged rollers 12, which roll on the upper surfaces of the rails 1 with the flanges of the rollers bearing against the outside faces of said rails. The shoes or runners 11, as shown in Fig. 5, are preferably angular shaped brackets, although one of said brackets, preferably that one located on the right hand side of the machine, shown in Fig. 2, and illustrated in detail in Fig. 5, has a depending portion 13 formed with a bearing portion 14 and with a slot or opening 15, see Figs. 2 and 5, the purposes of which will be further explained. The upper ends of the uprights or standards 10 are connected at their upper ends by the transversely disposed top rail or board 16. The rail or board 16 where it is connected to the upright or standard 10 at the left hand side of the machine, looking at Fig. 2, is braced by an angular shaped bracket 17, and on the other side, said rail or board 16 and the upright or standard 10, are braced by a bracket 18. The bracket 17 is preferably arranged connecting the inside faces of the rail or board 16 and the upright or standard 10, whereas the bracket 18 preferably connects the outside faces of the rail or board 16 and the upright or standard 10 and is formed with the vertically arranged bearing portion 19 and the horizontally arranged bearing portion 20, for purposes which will be further explained.

21 designates a transversely disposed preferably angle bar. This bar is preferably located beneath the platform of the support, or in a plane below the washing machine and tubs or other receptacles, and its opposite ends are secured to horizontal portions of the angular brackets 11, being the shoes or runners for the wringer support, see Fig. 2, wherein a part of the said bar is shown broken away to illustrate its connection to one of the brackets 11. The bar 21, the brackets 11, the uprights or standards 10 and the rail or board 16 constitute the wringer support, on which the wringer is mounted and which is movable from one position to another on the elongated support. Secured to and depending from the bar 21, see Figs. 2 and 3, is a bracket 22. This bracket is provided with longitudinally arranged and axially alined bearings 23, and with the transversely disposed bearing 24. The main driving or master shaft 5 passes through and is journaled in the bearings 23 of the bracket 22 and between said bearings 23 and on the shaft 5 are loosely carried bevel gears 25. Meshing with the gears 25 is a bevel gear 26 which is carried on the inner end of a transversely disposed shaft 27, said shaft 27 being journaled in a bearing 24 of the bracket 22 and also in a bearing 14 of the bracket 11, located on the right hand side of the machine, looking at Fig. 2. The bevel gears 25 are provided with suitable clutch teeth 27ª, and adapted to have a clutch relation with the teeth of either of said gears 25 is a clutch member 28 having the usual spline and groove connection with the shaft 5, whereby when said clutch member 28 is moved into clutch engaging relation with either of the gears 25, such gearing is secured to and has a driving connection with the shaft 5. It is obvious from the foregoing description, that when the wringer support is moved longitudinally of the elongated support to position the wringer in different positions thereon, the shaft 27 is moved therewith and likewise, the gears 25, together with the clutch member 28, are slid along the main driving or master shaft 5.

The clutch member 28 is formed with an annular groove in which is seated the cranked end 29 of a rod 30, said rod passing through and having a bearing in the boxing 31 secured to the under side of the bar 21, see Figs. 2 and 3. The outer end of the rod 30 passes through an opening in an extension of the bracket 11 on the left hand side of the machine, looking at Figs. 1 and 2, and then is bent so as to extend upwardly in front of the upright or standard 10 on that side of the machine. The upstanding portion of the rod 30 forms a lever 32 having a hand gripping portion 33. The lever 32 is adapted to be seated in notches 34 of a locking plate 35 secured to the upright or standard 10, whereby when the lever 32 is in a position shown in Fig. 1, the clutch member 28 is neutral, but if moved to the left, looking at Fig. 1, the clutch member will be thrown into clutch engaging relation with the bevel gear 25 disposed to the right, see Fig. 1, and when said lever 32 is moved to the right, looking at Fig. 1, it will throw the clutch member 28 into engagement with the other bevel gear 25. In this way the wringer may be driven alternately in opposite directions, if desired.

The wringer as a whole is designated 36 and includes the rolls 37 and 38, the former having an extension shaft 39, said shaft at its outer end passing through and being journaled in a bearing 20 of the bracket 18. On the outer end of said shaft extension 39, is carried a bevel gear wheel 40. This wheel is in constant mesh with the bevel gear wheel 41 carried on the upper end of an upright shaft 42. Said shaft near its upper end passes through and is journaled in the bearing 19 on the bracket 18. The lower end of said shaft 42 passes through and has a bearing in the bracket 43 secured to the lower portion of the bracket 11, located on the right hand side of the machine. On the lower end of the shaft 42, is carried a bevel gear wheel 44, and said wheel is in constant mesh with the bevel gear wheel carried on but not secured to the outer end of the transversely disposed shaft 27, previously referred to. The gear 45 has a sleeve extension 46 with the clutch face 47, and adapted to be thrown in clutch engaging relation with said clutch face 47, is a clutch face 48 of a clutch member 49, reciprocally arranged on the transversely disposed shaft 27. Instead of providing a spline and groove connection between the clutch member 49 and the shaft 27, I provide the clutch 49 with a slot 50 through which projects a pin 51 secured to the shaft 27, see Fig. 5. This clutch member 49 is normally held disconnected from the sleeve of the gear 45 and may only be thrown into engaging relation therewith, by the operator pressing his or her foot upon a foot treadle for accomplishing this result.

The clutch member 49 has an annular groove 52 in which is seated a fork 53 secured to a transversely disposed reciprocal slide bar 54. The free end of this bar passes through the slot 15 in a depending portion 13 of the bracket 11, previously described, and said bar 54 is formed with shoulders 55 to limit the endwise movement of said bar 54 in opposite directions. The outer end of the bar 54 is pivotally connected at 56 with the lever 57, which in turn is pivotally connected at 58 to the bracket 11, arranged on that side of the machine. Adjustably connected with the lower end of the lever 57 is a bar 59 having an angular foot engaging portion 60. I adjustably connect the bar 59 with the lever 57 by providing the bar with a longitudinal slot 61 through which passes a bolt 62 which passes through lever 57. On the bar 54 is arranged a plate 63 having a hook to which is connected a spring 64, and said spring at its outer end is connected with the bracket 11, arranged on that side of the machine.

It is obvious from an examination of the drawings and a reading of the description of the parts just previously described, that when an operator places his or her foot upon the foot treadle 60, the lever 57 is swung toward the machine, moving the bar 54 crosswise from the machine away from the operator, which will cause yoke 53 to move the clutch member 49 into clutch engaging relation with the clutch face of the gear 45. When this is done, the wringer may be operated by throwing the lever 32 to the right or left, causing the clutch member 28 to be thrown into clutch engaging relation with either of the gears 25. In practice, the lever 32 would be first thrown for the purpose of actuating the shaft 27 through and by means of the clutch gears connecting the same with the shaft 5.

Unless the operator had his or her foot on the treadle 60, the operation of the shaft 27 would not transmit power to the shaft 42 and thence to the wringer, unless the operator should place his or her foot on the treadle 60 for the purpose of bringing about a clutch engaging relation between the clutch member 49 on the shaft 27 and clutch face of the gear 45, and immediately upon the operator taking his or her foot from the treadle 60, the wringer stops, owing to the spring 64 returning the bar 54 to the position shown in Fig. 2, disconnecting the clutch member 49 from clutch engaging relation with the clutch face of the gear 45.

The bevel gears 40 and 41 are housed in a housing 65 secured to the bracket 18 and shaped so as to conform to the contour of said gears 40 and 41 and serve to protect the operator from getting fingers or clothes caught in the said gears when they are in operation. At the lower end of the shaft 42, a housing 66 is provided, covering the gear 44, and in so doing, forms a protection for the said gear and the gear 43 against an operator getting clothes caught in the same.

What I claim is:

1. In a machine of the character described, in combination a support, a frame movably mounted thereon, a wringer mounted on said frame, a driving shaft, a shaft arranged at right angles to the driving shaft, gearing connecting said shafts, a clutch controlling said gearing, an upright shaft, gearing connecting said upright shaft with said second mentioned shaft, gearing connecting said upright shaft with said wringer, means controlling said clutch, and means controlling the operation of the gearing between said upright shaft and said second mentioned shaft.

2. In a machine of the character described, in combination, a support, a frame movably mounted thereon, a wringer mounted on said frame, a driving shaft, a shaft arranged at right angles to the driving shaft, gearing connecting said shafts, a clutch controlling the operation of said gears, a lever for operating said clutch, an upright shaft, gearing connecting the same and said wringer, a gear loosely carried on one end of said second mentioned shaft, a gear meshing therewith carried on the lower end of the upright shaft, and means controlling the connection of said loosely carried gear with its shaft.

3. In a machine of the character described, a support, a wringer movably mounted thereon, a driving shaft, a shaft arranged at right angles thereto, gearing connecting said shafts, a clutch controlling the operation of said gearing from said driving shaft, means for shifting said clutch, gearing connecting said second mentioned shaft with said wringer, one of such gears being loosely carried on said second mentioned shaft, means for clutching said loosely carried gear with its shafts, and means normally holding said clutching means in inoperative position.

4. In a machine of the character described, in combination, a support, a wringer movably mounted thereon, a driving shaft, a pair of gears loosely carried thereon, a clutch for clutching either of said gears to its shaft, a second shaft, a gear on said shaft in mesh with said gears on the driving shaft, a lever for throwing said clutch, a gear loosely carried on said second mentioned shaft, a clutch member for controlling the connection of said loosely carried gear with its shaft, gearing between said loosely carried gear and said wringer, a foot treadle for throwing said clutch member, and means for normally holding said foot treadle and said clutch member in inoperative position.

5. In a machine of the character described, in combination, a support, a wringer mounted thereon, a driving shaft, a second shaft, gearing for operating said second shaft from said driving shaft, gearing for operating said wringer from said second shaft, a clutch included in said first mentioned gearing for controlling the operation of said second shaft from said driving shaft, a clutch included in said second mentioned gearing for controlling the operation of the wringer from said second shaft, a hand lever for moving said first mentioned clutch, a foot treadle for moving said second mentioned clutch, and means for normally holding said treadle and second mentioned clutch in inoperative position.

6. In a machine of the character described, in combination, an elongated support, a frame comprising uprights, a top cross piece and a bottom cross piece mounted upon and movable longitudinally on said support, a wringer on said top cross piece, a longitudinally disposed driving shaft, a shaft at right angles thereto, an upright shaft, said upright shaft and said right angle shaft being movable with said frame, gearing connecting said upright shaft and said wringer, gearing connecting said upright shaft and said right angle shaft, gearing connecting said driving shaft and said right angle shaft, a clutch for controlling the operation of gearing connecting the driving shaft with said right angle shaft, a clutch for controlling the operation of gearing connecting said right angle shaft with said upright shaft, a hand lever for moving said first mentioned clutch, a foot treadle for moving said second mentioned clutch, and means for normally holding said foot treadle and said second mentioned clutch in inoperative position.

7. In a machine of the character described, in combination, an elongated support, a frame mounted upon and movable longitudinally thereof, a wringer on said frame, an upright shaft journaled on said frame, bevel gears connecting the upper end of said shaft with said wringer, a bevel gear on the lower end of said shaft, a driving shaft, a shaft arranged transversely of the support and journaled on said frame, a bevel gear on the inner end of said transverse shaft, a pair of bevel gears loosely carried on the driving shaft and in mesh with said bevel gear on the inner end of the transverse shaft, means for clutching either of said loosely carried gears to said driving shaft, a bevel gear loosely carried on the outer end of said transverse shaft and meshing with the bevel gear carried on the lower end of the upright shaft, and means for clutching said loosely carried gear to said transverse shaft.

8. In a machine of the character described, in combination, a support, a frame mounted and movable thereon, a driving shaft, a second shaft, said second shaft journaled on said frame and movable therewith, a pair of bevel gear wheels loosely carried and slidable on said driving shaft, a bevel gear wheel on said second shaft meshing with said loosely carried gears, a clutch member slidably carried on said driving shaft and adapted to revolve therewith, means for controlling the engagement of said clutch member with either of said loosely carried gears, a bevel gear wheel loosely carried on said second shaft, a clutch member on said second shaft adapted for clutching said loosely carried gear with said second shaft, a reciprocal bar for moving said last mentioned clutch member, a foot treadle for moving said reciprocal bar, a spring for normally holding said treadle and bar in inoperative position, a wringer mounted on said frame, and means for operating the wringer from said loosely carried gear on said second shaft.

9. In a machine of the character described, in combination, a support, a frame mounted and movable thereon, a wringer on said frame, a driving shaft, a second shaft journaled on said frame, clutch controlled gearing between said shafts, means for moving the clutch, means for holding the clutch moving means in adjusted positions, a gear loosely carried on said second shaft, means for operating the wringer from said loosely carried gear, a clutch member on said second shaft, a clutch member on said second shaft adapted to clutch said loosely carried gear to its shaft, a reciprocal bar carried and guided by said frame, a foot treadle for operating said bar, and a spring for normally holding said foot treadle and said bar in inoperative position.

10. In a machine of the character described, in combination, a support, a frame comprising uprights, a top cross piece connecting the same and a bottom cross piece connecting said uprights, a wringer mounted on said top piece, a bracket connecting one upright and one end of said top piece and provided with a vertical and a horizontal bearing portion, a wringer shaft journaled in said horizontal bearing, an upright shaft having its upper end journaled in said vertical bearing, a bearing for the lower end of said shaft, gearing connecting the wringer shaft with the upright shaft, a driving shaft, a shaft between the driving shaft and said upright shaft, means for operating said last mentioned shaft, and means for transmitting such movement to the upright shaft.

11. In a machine of the character described, in combination, a support, a frame mounted and movable thereon, a wringer on said frame, an upright shaft suitably journaled on said frame, gearing connecting the upper end of said upright shaft with said wringer, a driving shaft, a cross shaft between the driving and upright shafts, said cross shaft suitably journaled on said frame, means for operating the cross shaft from the driving shaft, and means for operating the upright shaft from the cross shaft.

12. In a machine of the character described, in combination, a support, a frame comprising a pair of uprights connected by a top cross piece, a bracket for the lower end of each upright, a lower cross piece connected with said brackets, a wringer on said frame, an upright shaft journaled on said frame, gearing connecting the upright shaft and said wringer, a driving shaft, a cross shaft, a bearing for one end of said cross shaft on one of said brackets, a bearing for the other end of said cross shaft supported by said lower cross piece, means for operating said cross shaft from said driving shaft, clutch controlled gearing for operating the upright shaft from the cross shaft, and means for controlling said clutch.

ALPHEUS W. ALTORFER.

Witnesses:
J. M. ANDERSON,
CHAS. W. LA PORTE.